United States Patent
Wollenstein et al.

(10) Patent No.: US 9,489,447 B2
(45) Date of Patent: Nov. 8, 2016

(54) SCALABLE CURRENT LEADERBOARD USING DELTA-ENCODED UPDATES

(71) Applicant: Google Inc., Mountain View, CA (US)

(72) Inventors: Derek Alexander Wollenstein, Palo Alto, CA (US); Daniel Alan Rodney, Austin, TX (US); Haruyoshi Sakai, Fremont, CA (US); Steve Martin, Mountain View, CA (US)

(73) Assignee: GOOGLE INC., Mountain View, CA (US)

(*) Notice: Subject to any disclaimer, the term of this patent is extended or adjusted under 35 U.S.C. 154(b) by 372 days.

(21) Appl. No.: 14/186,209

(22) Filed: Feb. 21, 2014

(65) Prior Publication Data

US 2015/0242434 A1     Aug. 27, 2015

(51) Int. Cl.
| | | |
|---|---|---|
| *G06F 17/30* | (2006.01) | |
| *A63F 13/798* | (2014.01) | |
| *A63F 13/79* | (2014.01) | |
| *A63F 13/30* | (2014.01) | |

(52) U.S. Cl.
CPC ......... *G06F 17/30598* (2013.01); *A63F 13/30* (2014.09); *A63F 13/79* (2014.09); *A63F 13/798* (2014.09); *G06F 17/3053* (2013.01)

(58) Field of Classification Search
None
See application file for complete search history.

(56) References Cited

U.S. PATENT DOCUMENTS

| | | | |
|---|---|---|---|
| 8,001,003 B1* | 8/2011 | Robinson | G06Q 30/0201 705/14.53 |
| 8,376,825 B2 | 2/2013 | Guinn et al. | |
| 2011/0250969 A1 | 10/2011 | Van Os et al. | |
| 2012/0322561 A1 | 12/2012 | Kohlhoff | |
| 2013/0013094 A1 | 1/2013 | Parks et al. | |
| 2013/0197679 A1 | 8/2013 | Balakrishnan et al. | |
| 2015/0238864 A1* | 8/2015 | Taoka | A63F 13/67 463/23 |

OTHER PUBLICATIONS http://swarmconnect.com/admin/javadoc/com/swarmconnect/SwarmLeaderboard.html archived at archive.org on Jun. 21, 2013.*
https://partner.steamgames.com/documentation/community_data archived at archive.org on Jul. 16, 2011.*

* cited by examiner

*Primary Examiner* — Jay Morrison
(74) *Attorney, Agent, or Firm* — Morris & Kamlay LLP

(57) ABSTRACT

Systems and techniques are provided for providing a scalable current leaderboard. Entries may be received. The entries may include an identifier and a score. The entries may be sorted according to a sorting criterion to obtain a leaderboard. The entries may be ranked with a rank according to the position of the entry on the leaderboard. The entry may include the rank. The leaderboard may be divided into buckets. Each bucket may include consecutive entries from the leaderboard. One of the entries may be included at the end of a first buckets and at the beginning of a second buckets. The buckets may be ordered sequentially. The bucket may be updated with score versions to produce an updated bucket, where the score versions may include new versions and old versions.

33 Claims, 7 Drawing Sheets

SCALABLE CURRENT LEADERBOARD USING DELTA-ENCODED UPDATES

BACKGROUND

A leaderboard may be a list of ordered values and identifiers which may represent, for example, scores achieved by users of a game. For example, a leaderboard may display entries including the names or other identifiers of users, their scores, and the ranking of their scores among the scores achieved by other users. Entries on the leaderboard may be ordered based on the scores, for example, with the scores and users sorted from highest score to lowest score. If the leaderboard is public and displays scores for a large number of users, for example, the users of a game available on mobile devices, the number of entries on the leaderboard may grow very large, for example, into the millions.

The leaderboard, and its data including the user names and scores, may be stored at some central location where users can access it. When viewing a leaderboard, a user's device may not have enough memory to hold or screen space to display the entire leaderboard, and the bandwidth needed to transfer a leaderboard with millions of entries to a user may be excessive. The user may instead receive only the portion of the leaderboard they're interested in viewing. However, if the user wishes to view another portion of the leaderboard, for example, by scrolling down past the already displayed entries, the user's device may need to receive another portion of the leaderboard and hold that portion in memory along with the first, resulting in additional communication overhead and memory usage. The first portion of the leaderboard may also be discarded when new portion is received, but this may lead to a disjointed experience, as the entries displayed on the screen may change completely when a new portion is received, rather than changing one at a time as they would during normal scrolling.

As users scores are submitted to the leaderboard, the ordering of the entries and the ranking of the scores may need to be changed to reflect scores for new users and higher scores achieved by old users. Additionally, the leaderboard may need to be updated, or rebuilt, to reflect users who want to hide their score, have deleted their accounts, want to unhide their score, or need to have their score removed from the leaderboard for any other reason. This may be computationally expensive when the leaderboard has millions of entries, resulting in millions of scores that need sorting. The leaderboard may be updated, or rebuilt, at regular or irregular intervals to reduce computational demands, but any users who access the leaderboard in between rebuilds will be viewing an outdated version of the leaderboard.

To avoid the storage and computational costs of large leaderboards, some leaderboards may be limited in size, due to either not having a large number of scores submitted or being restricted to a specific locality or time period. Other leaderboards may order and rank only a small percentage of entries, so that only, for example, the top 100 scores are sorted and rank for display as leaderboard, or may only order users scores based on estimated percentiles, rather than actual sorting and ranking of the scores.

BRIEF SUMMARY

According to an embodiment of the disclosed subject matter, entries may be received. The entries may include an identifier and a score. The entries may be stored by the scores according to a sorting criterion to obtain a leaderboard. Each of the entries may be ranked with a rank according to the position of the entry on the leaderboard. The entry may include rank. The entries from the leaderboard may be divided into buckets. Each of the buckets may include consecutive entries from the leaderboard and one of the entries may be included both in a position at the end of a first bucket and at the beginning of a second bucket. The buckets may be ordered sequentially. The leaderboard may be stored in the form of the buckets.

A request may be received for a portion of the leaderboard. The request may include one item selected from the group including an identifier for a desired entry, a score for a desired entry, a rank for a desired entry, and a general request for the leaderboard associated with a default desired entry. The bucket that includes the desired entry may be identified. The bucket may be updated with a score version. The score version may include either of an entry for an old version associated with an entry for a new version or an entry for a new version not associated with an entry for an old version. The new version may include one item selected from the group including an entry that was not in the entries sorted to obtain the leaderboard and an entry that may be a removal indicator. The old version includes one item selected from the group including an entry that was in the entries sorted to obtain the leaderboard and an entry that may include an addition indicator. The entries in the bucket may be sorted according to the sorting criteria and ranked after the sorting to obtain an updated bucket. The updated bucket may be transmitted.

An entry may be included in an overlap section of the first and second buckets, and the number of entries included in each overlap section may be determined based the maximum number of entries displayed at one time by a client device. The number of entries in each overlap section may be equal to or greater than one less than the maximum number of entries displayed at one time by the client device. The number of the entries in each overlap section may be set such that the client device does not require two buckets simultaneously to display any sequence of consecutive entries from the leaderboard.

The entry for an old version may be matched to an entry in the bucket. The entry in the bucket may be replaced with the entry for the new version associated with the old version when the entry for the new version includes an identifier and a score. The entry may be removed from the bucket when the entry for the new version includes a removal indicator. The entry may be removed from the bucket if the new version includes a score better than the best score in the bucket and at one score in the preceding bucket that is not also in the bucket. The entry for the new version may be added to the bucket when either the entry for the old version is an addition indicator, or when the entry for the new version includes a score less than or equal to the best score in the bucket and greater than or equal to the worst score in the bucket.

Updating the bucket, sorting the entries in the bucket, and ranking the entries in the bucket may not change the stored bucket. The bucket may be identified from among buckets based on the identifier, the score, or the rank for the desired entry. The bucket identified based on the score may be the bucket with the highest bucket rank and with a worst score that is worse than the score for the desired entry. The bucket identified based on the rank comprises the bucket preceding the bucket with highest bucket rank that is also lower than the rank for the desired entry.

The score may be associated with a game. The identifier may be one of a real name, a user name, a group name, and an identification number.

An entry may be received. The received entry may be stored with the entries. The received entry may be stored with the score versions as a score version including a new version and an old version, the new version including the received entry and the old version including an entry from the entries with a same identifier as the received entry. The score version may be discarded from the score versions when the entries are sorted to obtain the leaderboard.

The entry for the new version may be a removal indicator when the entry for the old version is to be removed from the sorted listed of entries according to one of a user action and an administrative action. The entry for the old version may be an addition indicator when the entry for the new version is to be added to the sorted listed of entries according to one of: a user action, and the identifier for the entry for the new version is not in any other of the entries in the leaderboard. The bucket rank of the bucket may be updated based on the score versions for entries in buckets with higher bucket ranks.

According to an embodiment of the disclosed subject matter, a means for receiving entries, where each of the entries includes an identifier and a score, a means for sorting the entries by the scores according to a sorting criteria to obtain a leaderboard, a means for ranking each of the entries with a rank according to the position of the entry on the leaderboard, where each of the entries further includes the rank, a means for dividing the entries from the leaderboard into buckets, wherein each of the buckets includes consecutive entries from the leaderboard and at least one of the entries is included both in a position at the end of a first of the buckets and at the beginning of a second of the buckets, and wherein the buckets are ordered sequentially, and a means for storing the leaderboard in the form of the buckets, are included.

A means for receiving a request for at least a portion of the leaderboard, where the request may include at least one item selected from the group including: an identifier for a desired entry, a score for a desired entry, a rank for a desired entry, and a general request for the leaderboard associated with a default desired entry, a means for identifying the bucket including the desired entry, a means for updating the bucket with a score version, where the score version may include either an entry for an old version associated with an entry for a new version, or an entry for a new version not associated with an entry for an old version, the new version may include one item selected from the group including an entry that was not in the entries sorted to obtain the leaderboard and an entry that includes a removal indicator, and the old version may include one item selected from the group including an entry that was in the entries sorted to obtain the leaderboard and an entry that includes an addition indication, a means for sorting the entries in the bucket according to the sorting criteria, a means for ranking the entries in the bucket after the sorting to obtain an updated bucket, a means for transmitting the updated bucket, a means for matching the entry for the old version to an entry in the bucket and one of using a means for replacing the entry in the bucket with the entry for the new version associated with the old version when the entry for the new version includes an identifier and a score, using a means for removing the entry from the bucket when the entry for the new version includes a removal indicator, and using a means for removing the entry from the bucket if the new version includes a score better than the best score in the bucket and at least one score in the preceding bucket that is not also in the bucket, a means for adding the entry for the new version to the bucket when either the entry for the old version is an addition indicator, or when the entry for the new version includes a score less than or equal to the best score in the bucket and greater than or equal to the worst score in the bucket, a means for identifying the bucket from among buckets based on one of the identifier, the score, and the rank for the desired entry, where the bucket identified based on the score may include the bucket with the highest bucket rank and with a worst score that is worse than the score for the desired entry, and where the bucket identified based on the rank may include the bucket preceding the bucket with highest bucket rank that is also lower than the rank for the desired entry, a means for receiving an entry, a means for storing the received entry with the entries, a means for storing the received entry with the score versions as a score version including a new version and an old version, the new version including the received entry and the old version comprising an entry from the entries with a same identifier as the received entry, a means for discarding the score version from the score versions when the entries are sorted to obtain the leaderboard, a means for transmitting a request for a leaderboard, wherein the request comprises at least one of an identifier for a desired entry, a score for a desired entry, a rank for a desired entry, and a general request for the leaderboard associated with a default desired entry, a means for receiving an updated bucket comprising the desired entry, a means for displaying the desired entry and entries consecutive with the desired entry from the updated bucket, a means for transmitting a second request for the leaderboard, where the second request may include a request for an entry not in the updated bucket, a means for discarding the updated bucket, a means for receiving a second updated bucket including the desired entry, and a means for displaying the desired entry and entries consecutive with the desired entry from the second updated bucket, are also included.

Systems and techniques disclosed herein may allow for a scalable current leaderboard using delta-encoded updates. Additional features, advantages, and embodiments of the disclosed subject matter may be set forth or apparent from consideration of the following detailed description, drawings, and claims. Moreover, it is to be understood that both the foregoing summary and the following detailed description are provided as examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Figures 1, 2:
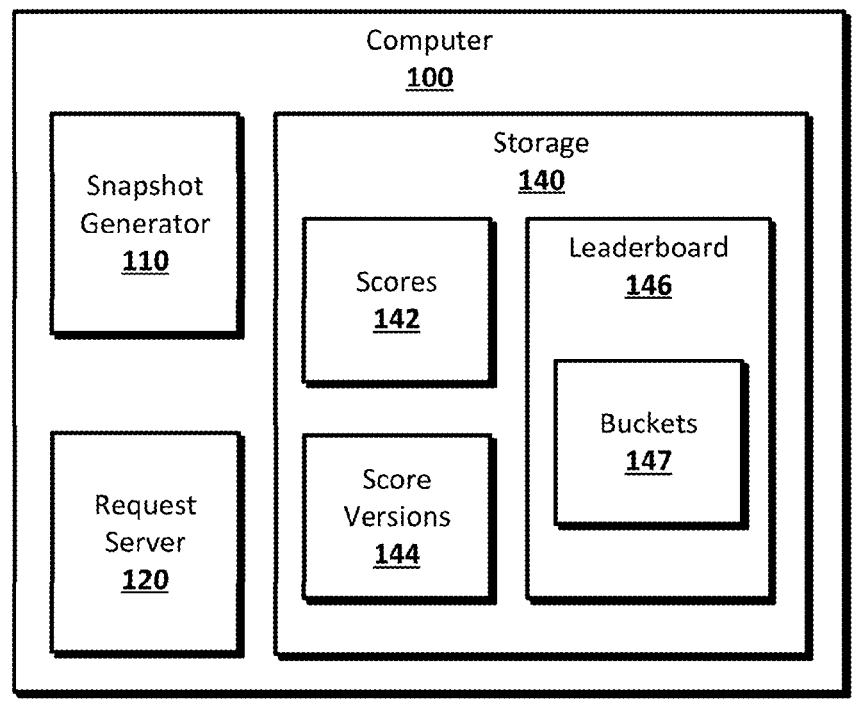
FIG. 1 shows an example system suitable for a scalable current leaderboard with delta-encoded updates according to an implementation of the disclosed subject matter.
FIG. 2 shows an example visualization of a leaderboard according to an implementation of the disclosed subject matter.

A scalable current leaderboard with delta-encoded updates may allow for the display of a current leaderboard between leaderboard rebuilds and reduce the resources used on a device displaying the leaderboard. In an implementation of the disclosed subject matter, a leaderboard, which may be a sorted list of scores, or values, along with ranks and identifiers, may be built from entries containing values and identifiers for the values. The leaderboard may be associated with a specific application or set of applications, such as a specific game or set of related games, and may be restricted to a specific locality, time period, or type of user. The scores, or values, may be of any suitable type for ordinal sorting, such as, for example, any quantity expressed with numbers, letters, or any other symbols that are ordinal. For example, a database may include numerical scores for a game submitted from devices used by users of the game, along with information about the user who submitted the score. The database may be any suitable database system storing data in any suitable format. The leaderboard may include entries, with each entry including a score and the identifier for the score. For example, entries in the leaderboard for a game may include the score and an identifier for the user who achieved and submitted the score, such as a real name, user name, identification number, or other suitable identifier.

When the leaderboard is built, entries may be ordered and ranked on the leaderboard based on the scores. The scores and identifiers from the database may be entries for the leaderboard, which may be sorted by score in any suitable manner, such as from highest to lowest or lowest to highest, and entries at the top of the leaderboard may have the highest rank. For example, the leaderboard for a game where higher scores are better may have entries sorted from highest score to lowest score, with the entry with the highest score receiving the highest rank of $1^{st}$. The leaderboard for a game that uses golf scoring, where lower scores are better, may have entries sorted from lowest score to highest score, with the entry with lowest score receiving the highest rank of $1^{st}$. Entries on the leaderboard may be ranked in order, for example, with an entry with the highest score as $1^{st}$ and an entry with the second highest score as $2^{nd}$.

After the leaderboard is built, or during the building process, the leaderboard may be divided into ordered groups, referred to herein as "buckets." Each bucket may include some number of consecutive entries from the leaderboard, and the entire leaderboard may be held across all of the buckets. The buckets may also be sequential, having an order based on the entries in the buckets. A bucket may include entries from the leaderboard that are also included in both a preceding and following bucket in overlap sections at the beginning and end of the bucket.

For example, the leaderboard for a game may have 3853 entries. The leaderboard may be divided into four buckets, and each bucket may include 1000 entries. A first bucket may include entries 1 to 1000, for example, the entries with the 1000 highest scores. A second bucket may include entries 952 to 1951, resulting in an overlap section at the end of the first bucket and beginning of the second bucket where the first and second bucket both include entries 952 to 1000. A third bucket may include entries 1903 to 2902, resulting in an overlap section where both the second and third bucket includes entries 1903 to 1951. A fourth bucket may include entries 2854 to 3853, resulting in an overlap section where both the third and fourth bucket include the entries 2854 to 2902.

The number of entries in the overlap sections may be chosen based on any suitable criteria, such as, for example, the maximum number of entries that can be displayed on the screen of any devices that might display the leaderboard. The number of entries in the overlap section may be chosen so that all of the entries displayed on the device's screen are always in one individual bucket, even if the user is scrolling through the entries one at a time, so that the device may not need to store more than one bucket at a time when displaying the leaderboard.

For example, if the maximum number of entries that any device used to display the leaderboard can display at one time is 50 entries, the overlap section may be set to include 49 entries. When the user of such a device views the leaderboard of 3853 entries that has been divided into four buckets, they may start with the first entry, from the first bucket, and scroll down. The user's device may request and receive the first bucket. The display may show 50 entries from the first bucket at a time, starting with entries 1 to 50, and the user may scroll down one entry at a time. When entries 951 to 1000 are displayed, scrolling down may require the display of entry 1001, which may not be in the first bucket. The device may request and receive the second bucket, and discard the first bucket. The device may display the second bucket starting at entry 952, so that the display may only scroll down one entry, adding entry 1001 to the bottom of the display. The device may display entries 952 to 1001 from the second bucket.

The overlap sections may only need to include one fewer entry than the maximum number of entries that can be displayed by any device that will display the leaderboard to ensure that only one individual bucket will need to be on the device to display any sequence of the maximum number of entries. The overlap section may be increased in size to decrease the number of situations which may require the device to request a different bucket. For example, if the user viewing entries 952 to 1001 scrolled up one entry, the device may need to request the first bucket again. If the overlap section were larger, for example, including 100 entries instead of 49, the user may be able to scroll back up to entry 901 before the first bucket may need to be requested again.

Bucket size may be variable across buckets, and may be changed to suit the number of entries on the leaderboard. For example, if the leaderboard included 4000 entries divided with 1000 entries per bucket and overlap sections with 50 entries, a fifth bucket may be needed for entries 3851 to 4000, along with an overlap section with entries 3801-3850.

The buckets may each have a bucket rank, which may be based on the rank of the entries the buckets include. For example, a bucket that includes entries 1001 to 2000 from a leaderboard may have a bucket rank of 1001, as 1001 may be the highest ranking entry in the bucket. The bucket rank may be used to rank the entries within the bucket when changes are made to the bucket, or to locate the bucket with a particular entry based on the rank of the entry. The buckets may be searched based on the worst score included in the bucket, which may be the last entry in the bucket. The worst score in each bucket may be used to find an appropriate bucket to send to a user's device when a request for leaderboard entries around a specific score is received. For example, if a request is received for entries with scores around a score 87, the last entry of the buckets may be checked until a score worse, for example, lower than, 87 is found, and that bucket may be sent out to fulfill the request.

The leaderboard may only be rebuilt in certain instances. For example, the leaderboard may be rebuilt on a set schedule, based on a trigger event, or on a probabilistic basis. Between rebuilds, new scores may be submitted to the database, for example, by users playing a game since the last time the leaderboard for the game was rebuilt. Other changes may also be made to the leaderboard. The new scores may not be reflected in the leaderboard until the next time the leaderboard is rebuilt. Score versioning with delta-encoded updates may be used to allow the leaderboard, as displayed to a user viewing the leaderboard on a device, to be current, even when the leaderboard has not been rebuilt. This may allow for a scalable current leaderboard, as even a large number of entries on the leaderboard may not prohibit the dynamic updating of a bucket of fixed size using score versioning before the bucket is sent to be displayed. The amount of processing and bandwidth need may be decreased compared to rebuilding and sending the entire leaderboard.

Scores and identifiers may be submitted by user devices to be stored in the database that contains the entries that will be put on the leaderboard. For example, when the user plays a game, the game may automatically submit the user's score and user name to the database containing scores and user names for that game whenever the game ends. Additionally, changes may be made to the entries on the leaderboard, and in the database. For example, the user may choose to make their score private, which may require the entry for the score to be removed from the leaderboard, or to make a private score public, allowing a score and identifier in the database but not on the leaderboard to be put on the leaderboard. The user may obtain a new high score that supersedes a score for that user already on the leaderboard. A game developer for the game associated with the leaderboard may need to have an entry removed from the leaderboard due restrictions on the user or because the score is not valid.

Any changes, additions, or deletions, made to any of the scores and identifiers in the database of scores between rebuilds may also be stored as score versions. The score versions may be stored in a database implemented in any suitable manner, and may include new versions for entries in the leaderboard, without the ranking, correlated with the old versions of the entries. The score version for an entry may be a delta-encoded update for the entry. For example, when the user achieves a new high score in a game, in addition to being stored with the scores, the new high score and user name may be stored in the score versions database as a new version along with the entry for the user's old high score as an old version. When a user wishes to make a public score private, removing it from the leaderboard, the request may be stored both with the scores and the score versions as an empty value correlated with the score the user wishes to make private. In the score versions database, the empty value may be stored as the new version, while the entry for the score being made private may be stored as the old version. The empty value stored as the new version may be a removal indicator. When a new user has a score submitted, the score and the new user name may be stored with the scores, and may also be stored as the new version with the score versions, with an empty value stored as the old version. The empty value stored as an old version may be an addition indicator. When an entry is received with a new version for an old version that is currently stored as a new version with the score versions, the latest entry may be stored as the new version while the immediately preceding entry may be stored as the old version. For example, the user of a game may set a high score twice in between rebuilds of the leaderboard for the game. The entry for the first high score may be stored as the new version with the entry for the user's previous high score as the old version. The entry for the second high score may then be stored as the new version with the entry for the first high score as the old version.

The score versions may be used to ensure that the leaderboard displayed to a user is always current, even when the leaderboard has not been rebuilt recently. When a request is received for a portion of the leaderboard, the appropriate bucket may be identified. Before the bucket is sent to the user's device to be displayed, the bucket may be updated using the score versions. Entries in the bucket that have been stored as old versions may be replaced by the correlated new versions from the score versions. This may update scores in entries when a user has achieved a new high score, remove entries from the bucket when the user has made their score private or their entry is to be removed for any other reason, and add entries to the bucket for new users and old users whose scores should be included in the bucket based on the best and worst scores in the bucket. The bucket may be re-sorted to ensure entries are still ordered by score, and the entries may also be re-ranked. Entries may be added to the bucket even when the old version is from a different bucket if the new version has a score that indicates that the entry for the new version belongs in the bucket. Entries may be removed from the bucket due to the score in a new version being better than both the best score in the bucket and the worst score in the next highest ranking bucket that is outside of the overlap section. Score versions that apply to buckets of higher rank than the bucket being sent to the user's device may also be used to determine if the bucket rank has changed due to entries being added or removed from higher ranking buckets. Applying the score versions to the bucket may produce an updated bucket, thought any stored version of the bucket and the leaderboard may not be changed.

For example, an entry in the bucket may be for a User #57, and may include a score of 65. Since the leaderboard was last rebuilt, the User #57 may have submitted a new, better score of 73. This new score may be stored with the score versions as a new version for the User #57, with the entry for the score of 65 stored as the old version. When the bucket including the entry with the score of 65 for the User #57 is requested, before the bucket is sent for display on the user's device, the entry for the new version for User #57 may replace the entry in the bucket that matches the old version, so that the displayed leaderboard will show a score of 73 for the User #57.

The leaderboard may also allow more than one entry with the same identifier. In this instance, the entry for the new version may not replace the entry for the old version. Instead, the entry for the new version may be added to the bucket if the score for the new version belongs in the bucket, and the old version may remain in the bucket. Any new version that is not a removal indicator may also not have an associated old version if entries on the leaderboard are not replaced by entries for new versions with the same identifier.

If the score in the entry for a new version is good enough, the entry may be removed from the bucket because it belongs in a bucket of higher rank. For example, a fourth bucket for a leaderboard may have a rank of 151, and the buckets may have overlap sections with 20 entries. The best score for an entry in the bucket may be 70, with an entry rank of 151. When the score versions are applied to the bucket before the bucket is sent to be displayed, an entry in the bucket may have an old version with a score of 60 replaced by a new version with a score of 80. 80 may be higher than not only the best score in the fourth bucket, but also the worst score in the third bucket that is not in the overlap section with the fourth bucket, which may have a rank of 150. In this instance, the entry may be removed from the bucket, and the entry with the score of 80 may not appear when the bucket is displayed on a user's device. To view the entry with the score of 80, the user may have to scroll up on the leaderboard to receive the third bucket, which may have the entry with the score of 80 added when the score versions are applied.

The application of the score versions to the bucket may also result in entries from other, lower-ranked buckets being added to the bucket. Once the entries in the bucket have been updated, new versions that have scores that belong in the bucket, for example, because the score is between the best and worst score for the bucket, may be added to the bucket even if the old version is in a different bucket. For example, the score versions may include a new version for an entry in a fourth bucket for a leaderboard, replacing a score of 40 with a score of 90. The score of 90 may be high enough that the entry should be in the third bucket. When the third bucket is going to be sent for display on the user's device the score versions may be applied to the third bucket, updating any entries in the third bucket that have an applicable score version. The entries in the third bucket may then be re-sorted. This may result in the third bucket having, for example, a highest scoring entry of 105, and a lowest scoring entry of 87. After re-sorting the third bucket, the score versions may be checked for any new versions that have a score that is less than or equal to the highest scoring entry in the third bucket and greater than or equal to the lowest scoring entry in the third bucket. The new version with the score of 90 may be found to belong in the third bucket, and may be inserted into the third bucket at an appropriate location. The entries in the third bucket may then be re-ranked.

When the score versions indicate that entries have been added or removed from higher ranking buckets than the bucket being sent to the user's device, the ranking of the bucket may be recalculated. For example, a bucket with a rank of 2001 may be the third bucket for a leaderboard. Before the third bucket is sent to the user's device, updates to the third bucket may be made using the score versions. The score versions may also indicate that 20 entries have been removed from the second bucket, while 5 entries have been added to the second bucket, resulting in a total of 15 entries being removed from higher-ranking buckets. The rank of the third bucket may be adjusted to account for the 15 fewer entries now in higher-ranking buckets by making the bucket rank 1986. Entries in the third bucket may be re-ranked starting at rank 1986 before being sent for display.

In some instances, the new version may be stored with the score versions without an associated old version. When updating the bucket, the new version that does not have the associated old version may be used to replace an entry in the bucket with the same identifier as the entry for the new version without regard to whether the score in the new version is higher or lower than the score for the entry in the bucket. If no entry in the bucket has the same identifier as the new version, the new version that does not have the associated old version may be added to the bucket if the score for the new version belongs in the bucket, for example, is less than or equal to the highest score in the bucket and greater than or equal to the lowest score in the bucket.

The number of score versions stored may accumulate in between rebuilds of the leaderboard, so that applying the score versions to buckets becomes more computationally expensive as the time from the last leaderboard rebuild increases. Rebuilding of the leaderboard may be triggered by the score versions, for example, when a specified number of score versions are stored or a specified amount of storage is being used to hold the score versions. Once the leaderboard rebuild is started, the score versions that have accumulated since the last rebuild was started may be erased or moved to long-term storage. New entries and other changes to the leaderboard that are submitted during and after the rebuild may again be stored as score versions.

FIG. 1 shows an example system suitable for a scalable current leaderboard with delta-encoded updates according to an implementation of the disclosed subject matter. A computer 100 may include a snapshot generator 110, request server 120, and storage 140. The computer 100 may be any suitable device, such as, for example, a computer 20 as described in FIG. 11, for implementing the snapshot generator 110, the request server 120, and the storage 140. The computer 100 may be a single computing device, or may include multiple connected computing devices. The snapshot generator 110 may use scores 142 to build a leaderboard 146, and may divide the leaderboard 146 into buckets 147. The request server 120 may use the buckets 147 and the score versions 144 to serve a request from a client device for some portion of the leaderboard 146. The storage 140 may store the scores 142, the score versions 144, and the leaderboard 146. The leaderboard 146 may be stored in the form of the buckets 147.

FIG. 2 shows an example visualization of a leaderboard according to an implementation of the disclosed subject matter. The leaderboard 146 may be an ordered and ranked list of values and identifiers that are associated with a specific application, time, locality, or group of users. The application that the leaderboard 146 is associated with may be discrete, such as, for example, an individual game, or may be a group, for example, a group of games related by being part of the same gaming ecosystem. For example, the leaderboard 146 may include high scores for players of a game over the lifetime of the game across the world, or for a specific time period or country. When viewed by a user on client device, the leaderboard may include a header 210, which may provide an indication of what application the leaderboard 146 is associated with, and entries 220, which may include the data displayed on the leaderboard 146. The leaderboard 146 may be a public leaderboard, as the leaderboard 146, and all of the entries 220 on the leaderboard 146, may be viewable by any member of the public.

Each of the entries 220 may be a tuple, and may include an identifier 222, a score 224, and a rank 226. The identifier 222 may be a way of distinguishing the user, who may be a person, group, or other entity, to whom the score 224 belongs, and may be, for example, a real name for a person, a user name, a user identification number, a group name, a group identification number, or any suitable form of identifier for the users who submit the scores 224 that are displayed on the leaderboard 146. The score 224 may be the score achieved by the user in the application associated with the leaderboard 146, and may be any suitable ordinal value or symbol that represents an ordinal value. For example, the score 224 may be a numerical score achieved playing a game, or may be a running count of, for example, the total amount of time the user has spent playing games within a specific gaming ecosystem, or the total number of games the user has played. The rank 226 for the entry 220 may be a rank given to the score for the entry 220 within the leaderboard 146, and may be any suitable ordinal value or symbol that represents an ordinal value. For example, the $12^{th}$ highest score for a game may be given the rank of 12. The entries 220 on the leaderboard 146 may come from the scores 142 which may be stored in any suitable format. The entries 220 for the scores 142 may include the identifiers 222 and scores 224 submitted by users from client devices. The ranks 226 may be filled in for the entries 220 from the scores 142 when the leaderboard 146 is built. The entries 220 may be received from client devices using any suitable type of communications and connections, such as, for example, encrypted packets sent over public networks.

Figure 3:
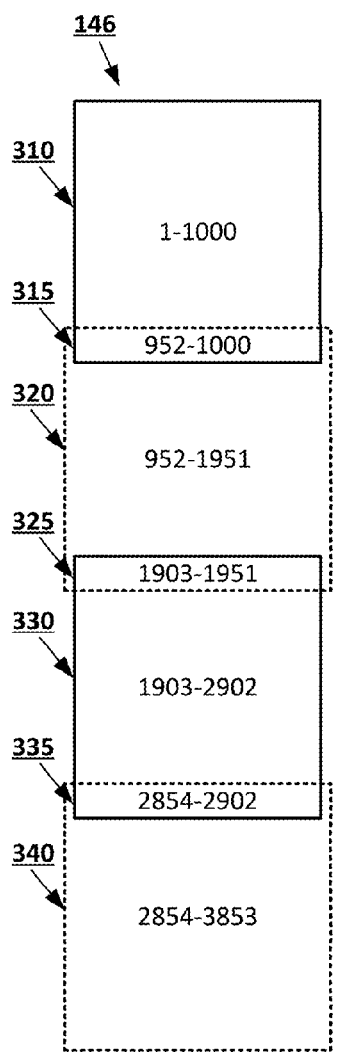
FIG. 3 shows an example of a leaderboard divided into buckets according to an implementation of the disclosed subject matter.

FIG. 3 shows an example of a leaderboard divided into buckets according to an implementation of the disclosed subject matter. The leaderboard 146 may be built from the entries 220 in the scores 142 by, for example, the snapshot generator 110, and may be a sorted list of the entries 220. The snapshot generator 110 may build, and rebuild, the leaderboard 146 at specific intervals, which may be any combination of pre-scheduled, probabilistic, or triggered. For example, the leaderboard 146 may have some probability of being rebuilt every time a new entry 220 is submitted to the scores 142, and may also be rebuilt once every hour. The snapshot generator 110 may build the leaderboard 146 by taking all of the entries 220 from the scores 142 that have not been marked as private or are otherwise not allowed to be displayed on the leaderboard 146, sorting the entries 220 based on the scores 224, and then ranking the entries 220 based on the results of the sorting. The sorting and ordering of the entries 220 on the leaderboard 146 may be done in any suitable manner. For example, the scores 224 may be sorted from highest to lowest, with the highest scores 224, being the best scores, at the top of the leaderboard 146. Or the entries 220 in leaderboard 146 may be in reverse order, with the best scores at the bottom of the leaderboard 146.

The snapshot generator 110 may divide the leaderboard 146 into the buckets 147, with each of the buckets 147 having an overlap section with preceding and following buckets. For example, the leaderboard 146 may be divided into the buckets 310, 320, 330, and 340, each including 1000 of the entries 220. The bucket 310 may include the entries 220 with the ranks 226 from 1 to 1000, the bucket 320 may include the entries 220 with the ranks 226 from 952 to 1951, the bucket 330 may include the entries 220 with the ranks 226 from 1903 to 2902, and the bucket 340 may include the entries 220 with the ranks 226 from 2854 to 3853. The overlap sections 315, 325, and 335 may include the entries 220 which are included in more than one of the buckets 310, 320, 330, and 340. For example, the overlap section 315 may include the entries 220 with the ranks 226 from 952 to 1000. The overlap sections 315, 325, and 335 may not be separate from the buckets 310, 320, 330, and 340, but may be sections of the buckets 310, 320, 330, and 340 that include the entries 220 that are also included in another bucket. The buckets 310, 320, 330, and 340 may be ranked according to the highest ranking entry 220 within each bucket. For example, the bucket 310 may have a bucket rank of 1, while the bucket 330 may have a bucket rank of 1903.

The leaderboard 146 may be displayed to users, for example on a client device. The client device may request the leaderboard 146 either generally, for example, starting at the top of the leaderboard 146, or specifically, for example, starting at a specified score 224 or rank 226 in the leaderboard 146. The appropriate one of the buckets 147 may be sent to the client device by, for example, the request server 120. For example, the client device may request the leaderboard 146 generally, and may receive the bucket 310, from, for example, the request server 120. The client device and the request server 120 may communicate using any suitable type of communications and connections, such as, for example, encrypted packets sent over public networks.

A request for the leaderboard 146 by rank or by score may be fulfilled by locating the appropriate one of the buckets 147 using, for example, the bucket rank or the worst score in the buckets 147. For example, the client device may request the leaderboard 146 starting at the entry 220 with the rank 226 of 1500. The appropriate bucket may be located by comparing the requested rank of 1500 to the bucket rank of the buckets 310, 320, 330 and 340 until a bucket with a bucket rank worse than the requested rank is found, and returning the previous bucket. The bucket 330, with a bucket rank of 1903, may be the first bucket with a bucket rank worse than 1500, so the bucket 320 may be the appropriate bucket to fulfill the request for the leaderboard 146.

A request for the leaderboard 146 by score may be fulfilled by locating the first one of the buckets 147 with a worst score that is worse than the requested score, and returning that one of the buckets 147. For example, the client device may request the leaderboard 146 starting with the entry 220 with the score 224 of 89. The worst score in the bucket 310 may be 95, and the worst score in the bucket 320 may be 85. The bucket 320 may be the appropriate bucket to fulfill the request.

The overlap sections 315, 325, and 335 may include a suitable number of the entries 220 so that only one bucket may need to be stored on the client device at a time for the client device to be able to display any sequence of the entries 220 from the leaderboard 146, although a different bucket may be needed for different sequences. The size of the overlap sections 315, 325, and 335 may be set according to the maximum number of the entries 220 that can be displayed at a time by any of the client devices that may access the leaderboard 146. For example, the overlap sections 315, 325, and 335 may include 49 of the entries 220, which may allow a client device that can display a maximum of 50 of the entries 220 at a time to need only one of the buckets 310, 320, 330, and 340 at a time.

For example, a user may wish to view the entries 220 on the leaderboard 146 with ranks 226 starting at a rank of 1825. The client device may send a request for the appropriate entries 220 on the leaderboard 146, and be sent the bucket 320 by, for example, the request server 120. The client device may display the entries 220 with ranks 226 from 1825 to 1874. The user may scroll down through the displayed entries 220, for example, one at a time. When the entry 220 with the rank 226 of 1951 is the last entry 220 displayed on the device, the 50 entries 220 displayed on the device may be the entries 220 with the ranks of 1902 to 1951. The user may scroll down by one entry. Because the entry 220 with the rank 226 of 1952 may not be included in the bucket 320, the client device may need to request the bucket 330, for example, from the request server 120. The client device may discard the bucket 320, and receive and display the bucket 330, starting with the entry 220 with the rank 226 of 1903 and ending with entry 220 with rank 226 of 1952. The user may only perceive that the leaderboard 146 displayed on the client device has scrolled down by one of the entries 220, despite the client device changing from the bucket 320 to the bucket 330, due to the overlap section 325.

Figure 4:
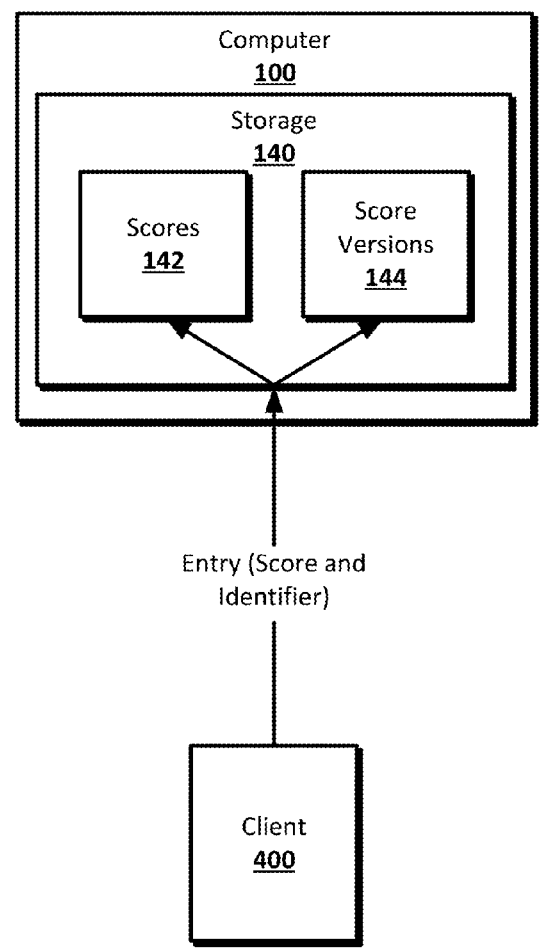
FIG. 4 shows an example arrangement for receiving an entry according to an implementation of the disclosed subject matter.

FIG. 4 shows an example arrangement for receiving an entry according to an implementation of the disclosed subject matter. The entries 220, including scores 224 and identifiers 222, may be received from client devices. A client device 400 may be any suitable device for using the application associated with the leaderboard 146, such as, for example, a mobile computing device, desktop, laptop, tablet, or smart phone. The user of the client device 400 may use the application associated with the leaderboard 146, such as, for example, a game. This may result in the score 224 and the identifier 222 being submitted for inclusion on the leaderboard 146. The score 224 and the identifier 222 may be stored with the scores 142 as an entry 220 with an empty rank 226, and with the score versions 144 as an entry 220 for a new version associated with an entry 220 for an old version. The old version may be an entry 220 from the scores 142 for the user with the same identifier 222 if the user already has a score in the scores 142. If the user is new, the old version may be an empty value or other addition indicator, or the new version may not have a correlated old version, and may just be stored as an independent entry 220 with the score versions 144. The entries 220 in the scores 142 may only include the best scores 224 for individual users, so a submitted score 224 and identifier 222 from the client device 400 may not be stored with the scores 142 and the score versions 144 if the submitted score 224 is not a new best score for the user.

Other changes to the entries 220 may also be received and stored with the scores 142 and the score versions 144. For example, the user may use the client device 400 to indicate that they wish to hide a previously public entry 220 with a public score 224. The entry 220 with the scores 142 may be marked, to indicate that the entry 220 should not be included in the next rebuild of the leaderboard 146. The new version for the entry 220 with the score versions 144 may be an empty value, or other removal indicator, associated with the old version of the entry 220. This may prevent the now private score 224 from appearing when the leaderboard 146 is viewed even before the leaderboard 146 has been rebuilt and incorporated the removal of the entry 220. The removal indicator may also be used as the new version for an entry 220 when the entry 220 is to be removed or hidden for any other reason. A private entry 220 that has been previously hidden or removed may also be made public. The entry 220 with the scores 142 may have any indications the entry 220 is private removed, and the new version for the entry 220 with the score versions 144 may be the entry 220, associated with an old version that is the empty value or other addition indicator. This may allow the now public entry 220 to appear on the leaderboard 146 even before the leaderboard 146 has been rebuilt and incorporated the un-hiding of the entry 220.

Figure 5:
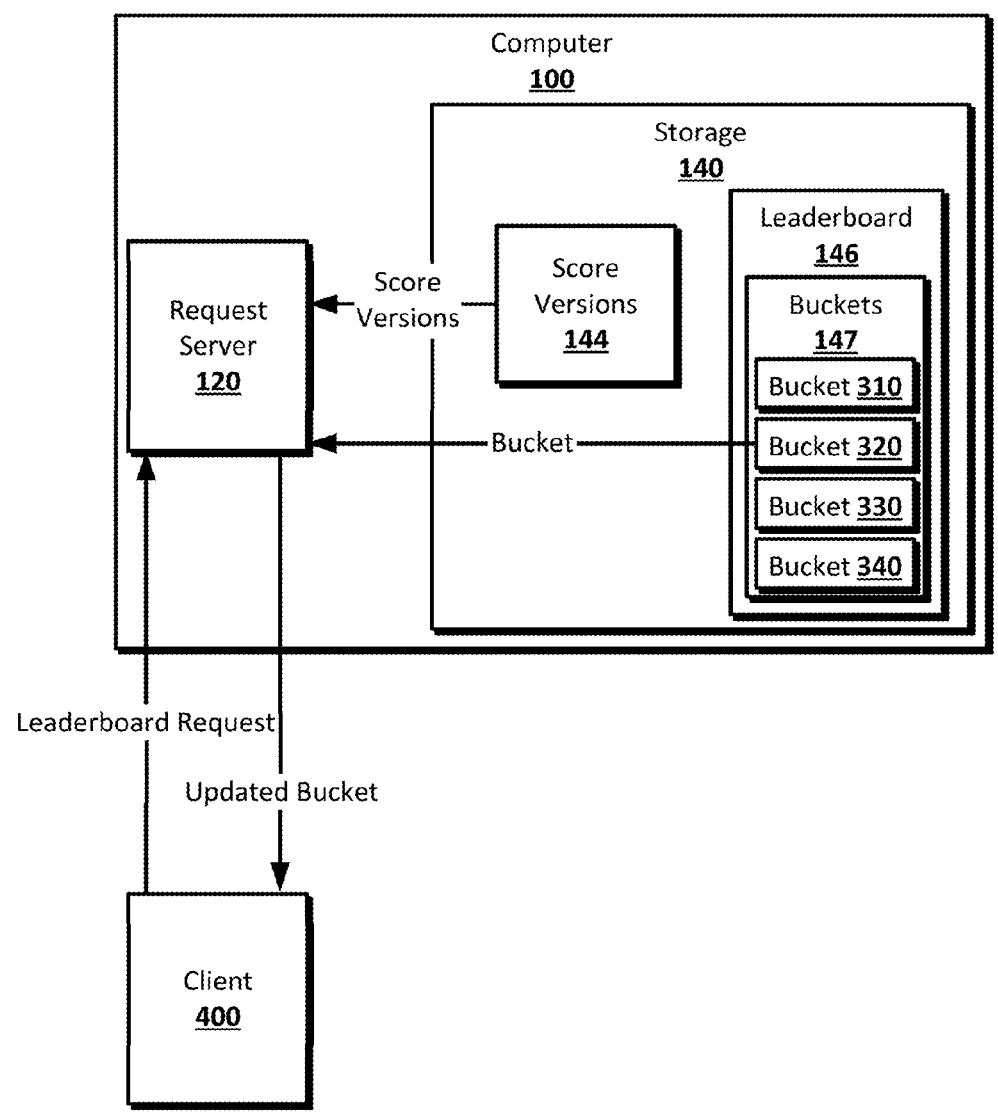
FIG. 5 shows an example arrangement for using a leaderboard according to an implementation of the disclosed subject matter.

FIG. 5 shows an example arrangement for using a leaderboard according to an implementation of the disclosed subject matter. The leaderboard 146 may only be rebuilt at certain intervals. In between rebuilds, new scores 224 may be submitted from client devices, such as the client device 400. The new scores 224 and identifiers 222 may be stored as entries 220 with the scores 142, but may not be on the leaderboard 146, as they were not present among the scores 142 during the last rebuild of the leaderboard 146. To ensure that the client device 400 displays the most current version of the leaderboard 146, including any entries 220 for scores 224 and identifiers 222 submitted after the leaderboard 146 was last rebuilt, the score versions 144 may be used to update any of the buckets 147 before the bucket is sent to be displayed on the client device 400. For example, the request server 120 may receive a request from the client device 400 to display the leaderboard 146 starting with an entry 220 that is in the bucket 320. The request server 320 may use the score versions 144 to update the bucket 320 before the bucket 320 is sent to the client device 400. This may result in an updated bucket being sent to the client device 400, although no changes may be made to data for the bucket 320 stored in the storage 140, leaving the bucket 320 in the same state as when the leaderboard 146 was last rebuilt.

Figure 6:
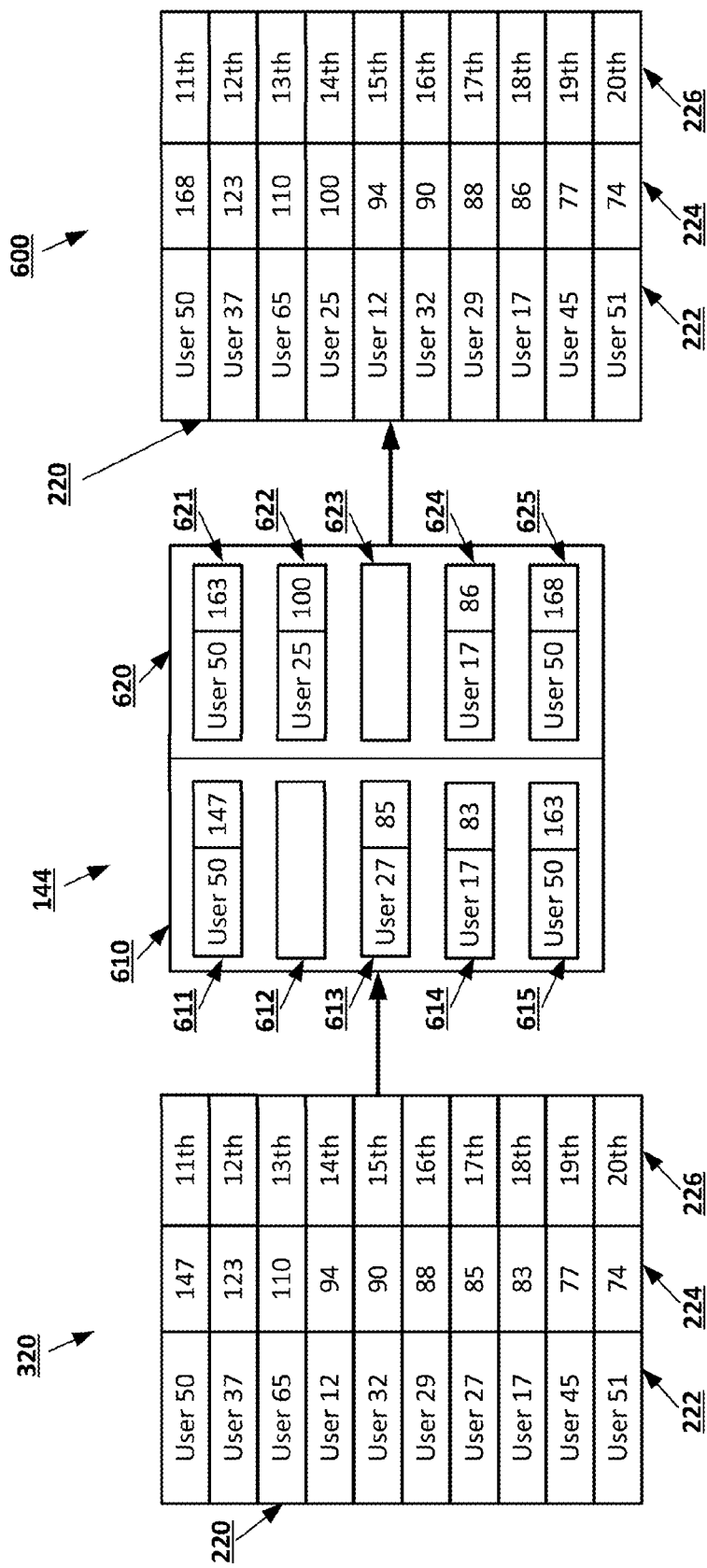
FIG. 6 shows an example of using delta-encoded updates with a leaderboard according to an implementation of the disclosed subject matter.

FIG. 6 shows an example of using delta-encoded updates with a leaderboard according to an implementation of the disclosed subject matter. The client device 400 may request to display the leaderboard 146 starting at the rank 226 of 11. The request server 120 may locate the appropriate one of the buckets 147 for the request, which may be, for example, the bucket 320 with 10 entries 220. Before the bucket 320 is sent to the client device 400, the score versions 144 may be used to update the bucket 320 by, for example, the request server 120, producing the updated bucket 600.

The score versions 144 may include old versions 610 and new versions 620, which may each be represented by an entry 220. The old versions 610 may be matched with the entries 220 in the bucket 320 and the matched entries 220 may be updated using the new versions 620. For example, the old version 611 and the new version 621 may be used to update the entry 220 for User 50, changing the score 224 from 147 to 163. The old version 615 and the new version 625 may be used to again update the score 224 for the User 50, changing it from 163 to 168, as the new version 621 may be the old version 615 for the new versions 625.

The old version 612, which may be an empty value, and the new version 622 may be used to add an entry 220 for the User 25, with a score 224 of 100. The empty value of the old version 612 may indicate that the User 25 is a new user, and did not have a previous entry 220 in the scores 142 or on the leaderboard 146, either due to not having previously submitted or having chosen to hide a previously submitted entry 220, or having the previously submitted entry 220 hidden or removed from the leaderboard 146 for any other reason. The User 25 may be added during the update to the bucket 320 because the score 224 of 100 falls in between the best and worst scores 224 in the bucket 320.

The old version 613 and the new version 623, which may be an empty value, may be used to remove the entry 220 for User 27. The new version 623 being an empty value may indicate the User 27 has chosen to make their score private, deleted their account, or had their score removed from the leaderboard 146 for any other suitable reason.

The old version 614 and the new version 624 may be used to update the score 224 for User 17 from 83 to 86. User 17 may have submitted an entry 220 with the new high score 224 of 86 after the last rebuilding of the leaderboard 146.

The updated bucket 600 may include all of the changes made to the entries 220 in the bucket 320 based on the score versions 144. The entries 220 in the updated bucket 600 may be re-sorted and re-ranked. For example, the User 29 may have a rank 226 of 17 in the updated bucket 600, down from a rank 226 of 16 in the bucket 320, due to the addition of the User 25 with the rank 226 of 14.

The re-ranking of the entries 220 in the updated bucket 600 may use the bucket rank of the updated bucket 600, which may be changed from the bucket rank of the bucket 320. The updated bucket 600 may also be affected by score versions 144 that don't apply directly to the bucket 320. The addition or removal of entries 220 from the higher ranked bucket 310 may affect the ranks 226 of the entries 220 in the bucket 600. For example, if the score versions 144 include new versions 620 for 5 entries 220 that are to be added to the bucket 310, the bucket rank of the bucket 320 may change from 11 to 16. The bucket rank for the updated bucket 600 may be used to rank the entries 220 in the updated bucket 600, starting by assigning the bucket rank as the rank 226 of the first entry 220 in the updated bucket 600, and counting down. For example, if the bucket rank of the updated bucket is changed to 16, the rank 226 for the User 50 may be changed to 16, and the rest of the ranks 226 of the entries 220 in the updated bucket 600 may decrease by 5, with, for example, the rank 226 of the User 29 going from 17 to 22.

In some instances, changes in bucket rank due to the addition or deletion of entries 220 in other buckets 147 may cause the updated bucket 600 to no longer include the entry 220 with the rank 226 that is responsive to the request from the client device 400. The updated bucket 600 may still be sent to the client device 400, and the user may need to scroll to find the requested rank 226, or the new appropriate bucket may be determined based on the rank changes caused by the application of the score versions 144. For example, the request from the client device may have been for the entry 220 on the leaderboard 146 with the rank 226 of 11. If the bucket rank of the updated bucket 600 is 16, then the entry 220 with the rank 226 of 11 may no longer be in the updated bucket 600, but in the bucket 310. The request server 120 may send the updated bucket 600 to the client device 400, or may apply the score versions 144 to the bucket 310 to produce another updated bucket 600.

The score versions 144 may also include new versions 620 for old versions 610 in lower ranked buckets 147 that may need to be added to higher ranked buckets 147. For example, if the score versions 144 include a new version 620 with a score 224 of 93 for an old version 610 with a score 224 of 70, the entry 220 for the new version 620 may belong in the bucket 320, even though the entry 220 corresponding to the old version 610 may be located in the bucket 330. The entry 220 for the new version 620 with the score 224 of 93 may be added to the updated bucket 600.

The new version 620 may include a score 224 that is too high for the associated old version 610 in the bucket 147 being updated with the score versions 144. This may result in the entry 220 for the old version 610 being removed from the bucket 147 and not being part of the updated bucket 600. For example, the new version 620 for User 51 may include the score 224 of 190. When the score versions 144 are used to update the bucket 320, applying the new version 620 for User 51 to the entry 220 for the User 51 may result in the entry 220 having a score 224 higher than the highest score in the bucket 320. The entry 220 for the User 51 may be moved to the top of the bucket 320, above the User 50 with the score 224 of 168, but this may result in incorrect ordering of the entries 220 on the leaderboard 146, as there may be entries 220 with scores 224 that are in between 190 and 168. The entry 220 for the User 51 may belong in the higher ranked bucket 310, and may be removed and not appear in the updated bucket 600.

The number of the score versions 144, including entries 220 for new versions 620 and old versions 610, may increase as the time since the last rebuild of the leaderboard 146 increases. The increasing number of the score versions 144 may make the application of the score versions 144 to update one of the buckets 147 increasingly computationally expensive. When there is some number of the score versions 144 in the storage 140 a rebuild of the leaderboard 146, for example, by the snapshot generator 110, may be triggered. The number of the score versions 144 needed to trigger a rebuild of the leaderboard 144 may be preset, configurable, or determined dynamically or probabilistically. Triggering a rebuild of the leaderboard 146 may also result in the score versions 144 being erased or moved to long term storage, as the entries 220 from the scores 142 that are in the score versions 144 may be incorporated into the rebuilt leaderboard 146, and no longer needed to update the buckets 147. New score versions 144 may begin to accumulate again based on submissions from the client devices 400 during and after the rebuild of the leaderboard 146.

Figure 7:
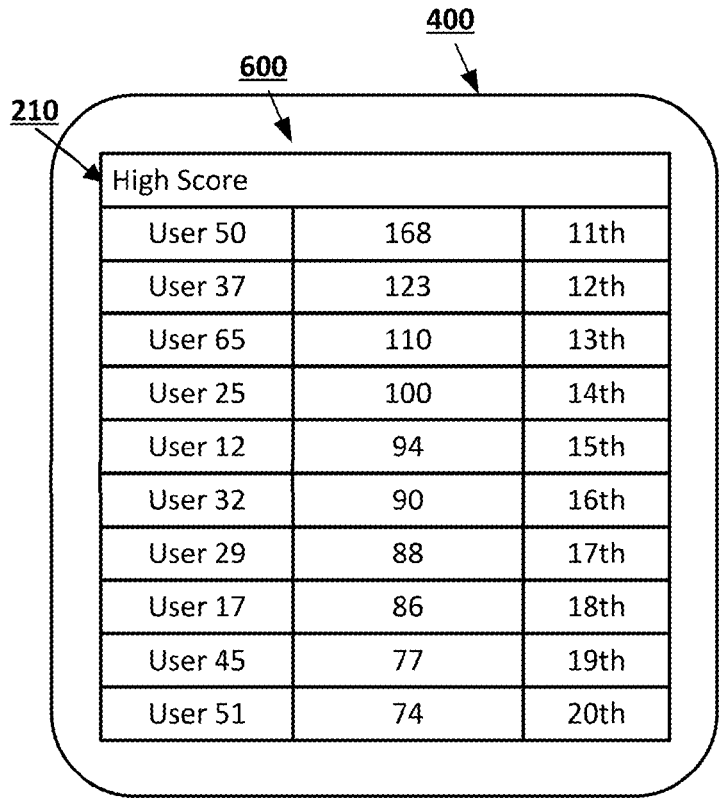
FIG. 7 shows an example of an updated bucket from a leaderboard displayed on a device according to an implementation of the disclosed subject matter.

FIG. 7 shows an example of an updated bucket from a leaderboard displayed on a device according to an implementation of the disclosed subject matter. After the bucket 320 has been updated with the score versions 144 to produce the updated bucket 600, the updated bucket 600 may be sent to the client device 400 to fulfill the request from the client device 400 to display the leaderboard 146. The updated bucket 600 may be displayed on the client device 400. The header 210 for the leaderboard 146 may also be displayed with the updated bucket 600. Any additional buckets 147 requested by the client device 400, for example, due to scrolling by the user, may be updated with the score versions 144 by, for example, the request server 120, before being sent to the client device 400.

Figure 8:
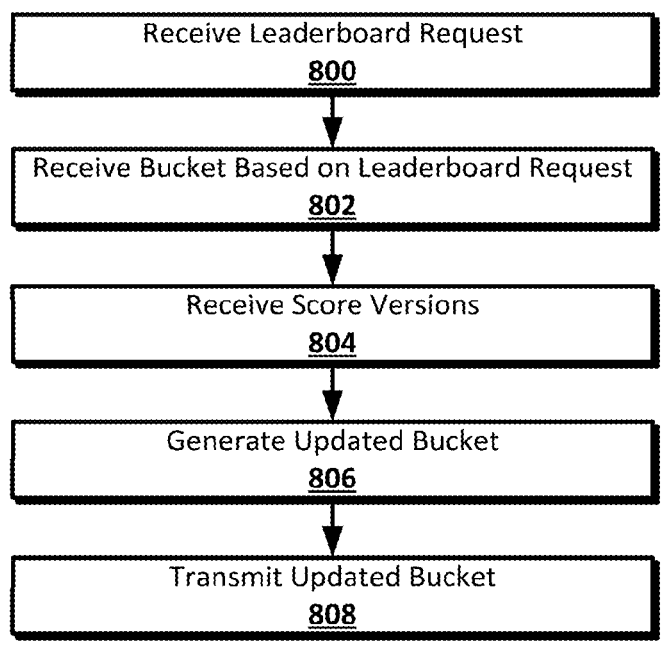
FIG. 8 shows an example process for serving a leaderboard request according to an implementation of the disclosed subject matter.

FIG. 8 shows an example process for serving a leaderboard request according to an implementation of the disclosed subject matter. At 800, a request for the leaderboard may be received. For example, the request server 120 may receive a request from the client device 400 for a portion of the leaderboard 146 including certain entries 220. The request may be based on the part of the leaderboard 146 that the user of the client device 400 wishes to view. The request may be specific, specifying an identifier 222, score 224, or rank 226, that the user would like to appear in the portion of the leaderboard 146 displayed on the client device 400, or general, requesting that leaderboard 146 be sent to the client device 400 starting with some default entry 220, such as, for example, the first entry 220. For example, the user may wish to see the portion of the leaderboard 146 containing their own score. This may be requested from the request server 120 using the identifier 222 for the user. The user may also have scrolled down past the end of one of the buckets 147, so the client device 400 may need to request the entry 220 at the start of the next bucket 147 to continue displaying the leaderboard 146.

At 802, a bucket may be received based on the request for the leaderboard. For example, the request server 120 may receive one of the buckets 147 for the leaderboard 146 from the storage 140. The bucket 147 received by the request server may be based on the nature of the request from the client device 400. A request for the leaderboard 146 generally may cause the request server 120 to receive the first of the buckets 147, for example, the bucket 310. A request for an identifier 222, score 224, or rank 226 may cause the request server 120 to receive the bucket 147 in which the entry 220 with the requested identifier 222, score 224, or rank 226 is located. The bucket 147 received by the request server 120 may be located by the score 224 or the rank 226 using, for example, bucket ranks or the worst scores 224 in the buckets 147.

At 804, the score versions may be received. For example, the request server 120 may receive the score versions 144 from the storage 140. The request server 120 may receive all of the entries 220 for the scores versions 144, including the old versions 610 and the new versions 620.

At 806, an updated bucket may be generated. For example, the request server 120 may use the score versions 144 to update the previously received bucket 147, for example, the bucket 320, generating the updated bucket 600. The entries 220 for the new versions 620 of the score versions 144 may be used to replace the entries 220 in the bucket 320 indicated by the old versions 610. This may add, remove, and update the entries 220 in the bucket 320. The bucket rank of the bucket 320 may be changed based on the addition or removal of the entries 220 from higher-ranked buckets, such as the bucket 310, based on the scored versions 144, although the request server 120 may not need to receive the higher-ranked buckets to determine this. Additional entries 220 may be added to the bucket 320 based on the new versions 620 with scores 224 that belong in the bucket 320, even when the entries 220 that match the old versions 610 are located in a different one of the buckets 147, for example, in the bucket 330. The updated entries 220 in the bucket 320 may be re-sorted and re-ranked, taking into account any change in the rank of the bucket 320, resulting in the updated bucket 600.

At 808, the updated bucket may be transmitted. For example, the request server 120 may transmit the updated bucket 600, using any suitable communications type and connections, to the client device 400 that submitted the request for the leaderboard 146. This may fulfill the request for the leaderboard 146. The client device 400 may be able to display the updated bucket 600.

Figure 9:
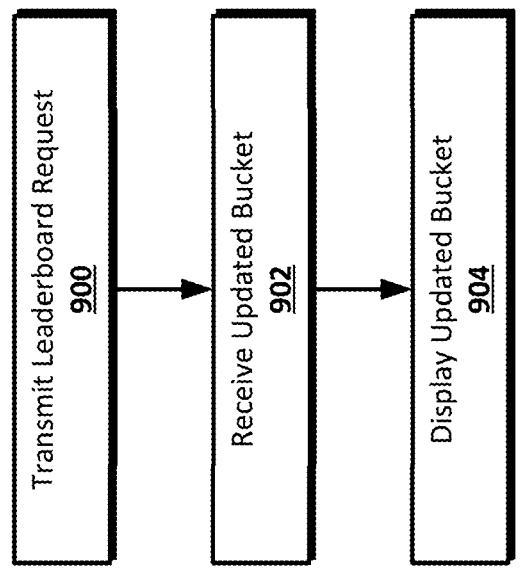
FIG. 9 shows an example process for displaying a leaderboard on a device according to an implementation of the disclosed subject matter.

FIG. 9 shows an example process for displaying a leaderboard on a device according to an implementation of the disclosed subject matter. At 900, a leaderboard request may be transmitted. For example, the client device 400 may transmit a request for the leaderboard 146 to the request server 120. The request for the leaderboard 146 may be based on, for example, input from the user into the client device 400, and may be a general request for the leaderboard 146, for example, starting at a default entry 220 such as the first entry 220 in the leaderboard 146, or may be a specific request, for a portion of the leaderboard 146 including entries 220 with a specific identifier 222, score 224, or range thereof, or rank 226, or range thereof.

At 902, an updated bucket may be received. For example, the client device 400 may receive the updated bucket 600 from the request server 120. The updated bucket 600 may be the bucket 147 that was responsive to the request from the client device 400, updated with the score versions 144. The updated bucket 600 may include the most up-to-date entries 220 available for the bucket 147 at the time the request was received and processed. For example, if the request was for the entry 220 with the rank 226 of 1000, the updated bucket 600 may be the result of applying the score versions 144 to the bucket 320.

At 904, the updated bucket may be displayed. For example, the updated bucket 600 may be displayed to the user on the client device 400, along with the header 210. The user may see the entries 220 that include the entry 220 that was part of the request for the leaderboard 146, along with other entries 220 in sequence with the requested entry 220. The entries 220 may be the most up-to-date entries 220 available at the time the request was submitted, allowing the user to see a current version of the leaderboard 146 in between rebuilds of the leaderboard 146. The user may interact with the entries 220 in any suitable manner. The user may use the client device 400 to scroll through the entries 220 that are included in the updated bucket 600 until an entry 220 from the leaderboard 146 that is not included in the updated bucket 600 is reached, at which time a new request for the leaderboard 146 may be transmitted.

Figure 10:
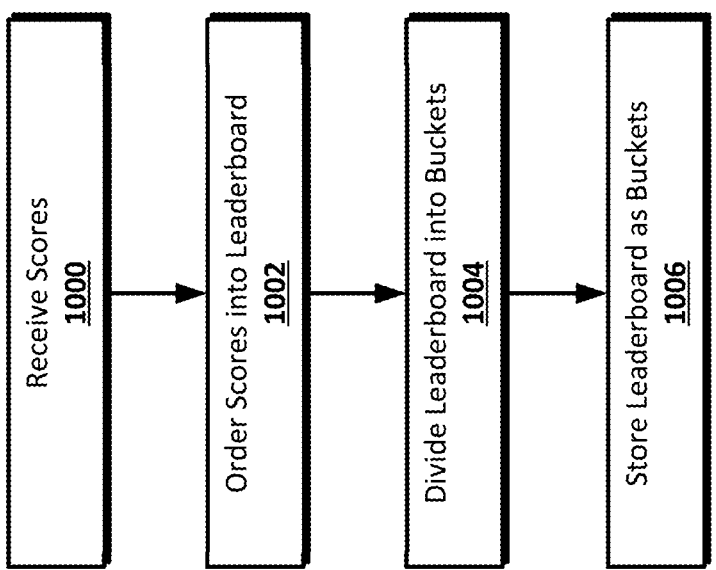
FIG. 10 shows an example process for rebuilding a leaderboard according to an implementation of the disclosed subject matter.

FIG. 10 shows an example process for rebuilding a leaderboard according to an implementation of the disclosed subject matter. At 1000, scores may be received. For example, the snapshot generator 110 may receive the scores 142 from the storage 140. The scores 142 may be received by the snapshot generator 142 when a build or rebuild of the leaderboard 146 has been triggered.

At 1002, the scores may be ordered into a leaderboard. For example, the snapshot generator 142 may sort the entries 220 for the scores 142 by the scores 224 in each entry 220. The scores 224 may be sorted in any suitable manner, based, for example, on the nature of the scores 224 and the leaderboard 146. For example, if the leaderboard 146 is for a golf game, the entries 220 may be sorted from lowest score 224 to highest score 224. Once the entries 220 have been ordered by the scores 224, the entries 220 may have their ranks 226 filled in, in any suitable manner based, for example, on the nature of the leaderboard 146. For example, the entry 220 with the best score 224, which may be at the top of the leaderboard 146, may receive the highest rank 226 of 1, and the other entries 220 may then be ranked sequentially. The sorting and ranking may result in the leaderboard 146.

At 1004, the leaderboard may be divided into buckets. For example, the snapshot generator 110 may divide the leaderboard 146 into any number of the buckets 147, such as, for example, the four buckets 310, 320, 333, and 340. Each of the buckets 147 may include any number of consecutive entries 220 from the leaderboard 146, such as, for example, 1000 of the entries 220. Different buckets 147 may hold different numbers of the entries 220. The snapshot generator 110 may divide the leaderboard 146 among the buckets 147 so that there is overlap in the entries 220 included in consecutive buckets 147. This may create overlap sections such as, for example, the overlap sections 315, 325, and 335. Each of the buckets 147 may include some number of the entries 220 that are also included in both the preceding and following bucket 147. For example, the beginning of the bucket 320 may include some of the entries 220 that are at the end of the bucket 310, and the end of the bucket 320 may include some of the entries 220 that are at the beginning of the bucket 330. The number of the entries 220 included in the overlap sections may be based on any suitable criteria, such as, for example, the maximum number of the entries 220 that can be displayed at one time by any of the client devices 400 that may display the leaderboard 146.

At 1006, the leaderboard may be stored as buckets. For example, the leaderboard 146 may be stored in the storage 140 in the form of the buckets 147. The leaderboard 146 may then be accessible by the request server 120, which may be able to receive the buckets 147 from the storage 140 to fulfill requests for the leaderboard 146, for example, from the client device 400.

As a specific example of embodiments of the presently disclosed subject matter, a request may be received for a portion of a leaderboard that includes the score for user #67, along with scores ranked 25-50. At the time the request is received, there may be a first bucket with scores ranked 1-100, but user #67 may be ranked 150. In this case, a bucket containing user rank position 150 may be retrieved, followed by a bucket containing user rank positions 1-100. The score versions may then be determined, which may indicate that a new user #523 was identified with the #1 position score. At that point a listing with scores in positions 24-49 may be listed in the original bucket; because there is a new score at rank #1, the system may retrieve scores for one rank earlier. In addition, user #67 may be identified as rank 151 because the original within-bucket rank of 150 is adjusted to account for the new user.

Figure 11:
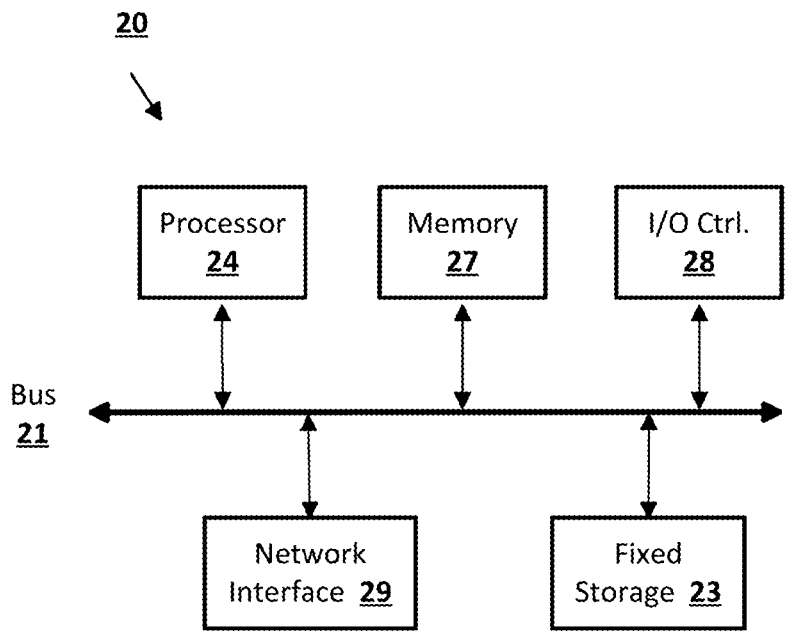
FIG. 11 shows a computer according to an embodiment of the disclosed subject matter.

Embodiments of the presently disclosed subject matter may be implemented in and used with a variety of component and network architectures. FIG. 11 is an example computer system 20 suitable for implementing embodiments of the presently disclosed subject matter. The computer 20 includes a bus 21 which interconnects major components of the computer 20, such as one or more processors 24, memory 27 such as RAM, ROM, flash RAM, or the like, an input/output controller 28, and fixed storage 23 such as a hard drive, flash storage, SAN device, or the like. It will be understood that other components may or may not be included, such as a user display such as a display screen via a display adapter, user input interfaces such as controllers and associated user input devices such as a keyboard, mouse, touchscreen, or the like, and other components known in the art to use in or in conjunction with general-purpose computing systems.

The bus 21 allows data communication between the central processor 24 and the memory 27. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as the fixed storage 23 and/or the memory 27, an optical drive, external storage mechanism, or the like.

Each component shown may be integral with the computer 20 or may be separate and accessed through other interfaces. Other interfaces, such as a network interface 29, may provide a connection to remote systems and devices via a telephone link, wired or wireless local- or wide-area network connection, proprietary network connections, or the like. For example, the network interface 29 may allow the computer to communicate with other computers via one or more local, wide-area, or other networks, as shown in FIG. 12.

Many other devices or components (not shown) may be connected in a similar manner, such as document scanners, digital cameras, auxiliary, supplemental, or backup systems, or the like. Conversely, all of the components shown in FIG. 11 need not be present to practice the present disclosure. The components can be interconnected in different ways from that shown. The operation of a computer such as that shown in FIG. 11 is readily known in the art and is not discussed in detail in this application. Code to implement the present disclosure can be stored in computer-readable storage media such as one or more of the memory 27, fixed storage 23, remote storage locations, or any other storage mechanism known in the art.

Figure 12:
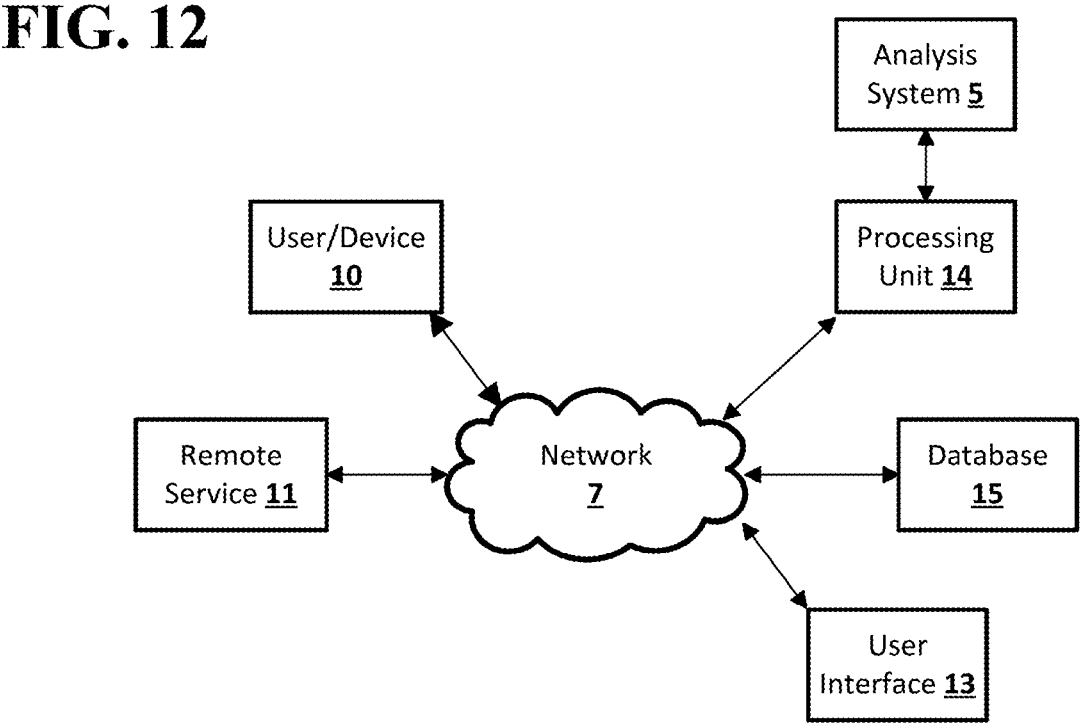
FIG. 12 shows a network configuration according to an embodiment of the disclosed subject matter.

FIG. 12 shows an example arrangement according to an embodiment of the disclosed subject matter. One or more clients 10, 11, such as local computers, smart phones, tablet computing devices, remote services, and the like may connect to other devices via one or more networks 7. The network may be a local network, wide-area network, the Internet, or any other suitable communication network or networks, and may be implemented on any suitable platform including wired and/or wireless networks. The clients 10, 11 may communicate with one or more computer systems, such as processing units 14, databases 15, and user interface systems 13. In some cases, clients 10, 11 may communicate with a user interface system 13, which may provide access to one or more other systems such as a database 15, a processing unit 14, or the like. For example, the user interface 13 may be a user-accessible web page that provides data from one or more other computer systems. The user interface 13 may provide different interfaces to different clients, such as where a human-readable web page is provided to web browser clients 10, and a computer-readable API or other interface is provided to remote service clients 11. The user interface 13, database 15, and processing units 14 may be part of an integral system, or may include multiple computer systems communicating via a private network, the Internet, or any other suitable network. Processing units 14 may be, for example, part of a distributed system such as a cloud-based computing system, search engine, content delivery system, or the like, which may also include or communicate with a database 15 and/or user interface 13. In some arrangements, an analysis system 5 may provide back-end processing, such as where stored or acquired data is pre-processed by the analysis system 5 before delivery to the processing unit 14, database 15, and/or user interface 13. For example, a machine learning system 5 may provide various prediction models, data analysis, or the like to one or more other systems 13, 14, 15.

In situations in which the systems and techniques disclosed herein collect personal information about users, or may make use of personal information, the users may be provided with an opportunity to control whether programs or features collect user information (e.g., information about a user's name, location, social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. As a specific example, where a leaderboard is capable of using a user's real name, screen name, social network profile, or the like, the system may provide an interface for each user to specify how and/or whether such information is used. Thus, the user may have control over how information is collected about the user and used by a leaderboard system as disclosed herein.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A computer-implemented method performed by a data processing apparatus comprising a snapshot generator, a server and a storage, the method comprising:
   receiving, by the snapshot generator, entries, wherein each of the entries comprises an identifier and a score;
   sorting, by the snapshot generator, the entries by the scores according to a sorting criteria to obtain a leaderboard;
   ranking, by the snapshot generator, each of the entries with a rank according to the position of the entry on the leaderboard, wherein each of the entries further comprises the rank;
   dividing, by the snapshot generator, the entries from the leaderboard into a plurality of groups, wherein each of the groups comprises consecutive entries from the leaderboard and at least one of the entries is included both in a position at the end of a first of the groups and at the beginning of a second of the groups, and wherein the groups are ordered sequentially;
   storing, in the storage, the leaderboard in the form of the groups;
   updating, by the snapshot generator, the first group with at least one score version comprising an entry that includes an addition indicator;
   sorting, by the snapshot generator, the entries in the first group according to the sorting criteria to obtain an updated group; and
   transmitting, by the server to the client device, the updated group.

2. The computer-implemented method of claim 1, further comprising:
   receiving, by the snapshot generator, a request for at least a portion of the leaderboard, wherein the request comprises at least one item selected from the group consisting of: an identifier for a desired entry, a score for a desired entry, a rank for a desired entry, and a general request for the leaderboard associated with a default desired entry; and
   identifying, by the snapshot generator, the first group from the plurality of groups that includes the desired entry.

3. The computer-implemented method of claim 2, wherein the at least one score version comprises an entry for an old version associated with an entry for a new version, and the old version comprises one item selected from the group consisting of an entry that was in the entries sorted to obtain the leaderboard, and an entry that comprises the addition indicator.

4. The computer-implemented method of claim 3, wherein the entry for the old version comprises the addition indicator when the entry for the new version is to be added to the sorted listed of entries according to one of: a user action, and the identifier for the entry for the new version is not in any other of the entries in the leaderboard.

5. The computer-implemented method of claim 2, wherein the at least one score version comprises an entry for a new version not associated with an entry for an old version, and the new version comprises one item selected from the group consisting of: an entry that was not in the entries sorted to obtain the leaderboard, and an entry that comprises a removal indicator.

6. The computer-implemented method of claim 5, wherein the entry for the new version comprises a removal indicator indicating that the entry for the old version is to be removed from the sorted listed of entries according to one of a user action and an administrative action.

7. The computer-implemented method of claim 2, wherein the entry for the new version is not associated with an entry for an old version when the entry for the new version comprises an identifier not already in an entry in the leaderboard.

8. The computer-implemented method of claim 2, wherein updating the first group, sorting the entries in the first group, and ranking the entries in the first group each further comprise not changing the stored first group.

9. The computer-implemented method of claim 2, wherein the first group comprises a group rank, and wherein identifying, by the snapshot generator, the first group from the plurality of groups that includes the desired entry further comprises:
   identifying, by the snapshot generator, the first group from among groups based on at least one of the identifier, the score, and the rank for the desired entry,
   wherein the first group identified based on the score comprises the first group with the highest group rank and with a worst score that is worse than the score for the desired entry, and
   wherein the first group identified based on the rank comprises the first group preceding the group with highest group rank that is also lower than the rank for the desired entry.

10. The computer-implemented method of claim 9, wherein the group rank of the first group is updated based on the score versions for entries in groups with higher group ranks.

11. The computer-implemented method of claim 10, wherein ranking the entries in the first group is based on the group rank of the group.

12. The computer-implemented method of claim 2, further comprising:
   receiving, by the snapshot generator, an entry;
   storing, in the storage, the received entry with the entries;
   storing, in the storage, the received entry with the score versions as a score version comprising a new version and an old version, the new version comprising the received entry and the old version comprising an entry from the entries with a same identifier as the received entry;
   discarding, by the snapshot generator, the score version from the score versions when the entries are sorted to obtain the leaderboard.

13. The computer-implemented method of claim 2, wherein the default desired entry comprises a rank of 1.

14. The computer-implemented method of claim 1, wherein the at least one entry is included in an overlap section of the first and second groups, and wherein the number of entries included in each overlap section is determined based the maximum number of entries displayed at one time by a client device.

15. The computer-implemented method of claim 14, wherein the number of entries in each overlap section is equal to or greater than one less than the maximum number of entries displayed at one time by the client device.

16. The computer-implemented method of claim 14, wherein the number of the entries in each overlap section is set such that the client device does not require two groups simultaneously to display any sequence of consecutive entries from the leaderboard.

17. The computer-implemented method of claim 1, wherein the score is associated with a game.

18. The computer-implemented method of claim 1, wherein the identifier is one of a real name, a user name, a group name, and an identification number.

19. The computer-implemented method of claim 1, wherein the receiving, sorting, ranking, and dividing are part of one of a leaderboard build and a leaderboard rebuild.

20. The computer-implemented method of claim 19, wherein the leaderboard rebuild is triggered by the accumulation of a preset number of score versions.

21. A computer-implemented method performed by a client device in communication with a computer that comprises a snapshot generator, a server and a storage, the method comprising:
  transmitting, by the client device, a request for a leaderboard, wherein the request comprises at least one of an identifier for a desired entry, a score for a desired entry, a rank for a desired entry, and a general request for the leaderboard associated with a default desired entry, wherein entries for the leaderboard are divided into a plurality of groups, wherein each of the groups comprises consecutive entries from the leaderboard and at least one of the entries is included both in a position at the end of a first of the groups and at the beginning of a second of the groups, and wherein the groups are ordered sequentially, wherein the first group is updated with at least one score version comprising an entry that includes an addition indicator to indicate an addition of the desired entry into the first group, and wherein the entries in the first group are sorted according to a sorting criteria to obtain an updated group;
  receiving, by the client device, the updated group comprising the desired entry; and
  displaying the desired entry and entries consecutive with the desired entry from the updated group.

22. The computer-implemented method of claim 21, further comprising:
  transmitting a second request for the leaderboard, where the second request comprises a request for an entry not in the updated group;
  discarding the updated group;
  receiving a second updated group comprising the desired entry; and
  displaying the desired entry and entries consecutive with the desired entry from the second updated group.

23. The computer-implemented method of claim 22, wherein the displayed entries consecutive with the desired entry from the first group and the displayed entries consecutive with the desired entry from the second group comprise at least one of the same entry.

24. The computer-implemented method of claim 21, wherein the leaderboard is associated with a game.

25. A computer-implemented system for stitching tables comprising:
  a storage comprising scores, score versions, and a leaderboard, wherein the leaderboard comprises groups, and configured to receive entries and store the entries with the scores and the score versions;
  a snapshot generator configured to generate the leaderboard from the scores and divide the leaderboard into the groups, wherein each of the groups comprises consecutive entries from the leaderboard and at least one of the entries is included both in a position at the end of a first of the groups and at the beginning of a second of the groups, wherein the groups are ordered sequentially, wherein the first group is updated with at least one score version comprising an entry that includes an addition indicator, and wherein the entries in the first group are sorted according to a sorting criteria to obtain an updated group; and
  a request server, coupled to the storage and configured to receive requests for the leaderboard, receive one of the groups, update the one of the groups with the score versions to generate an updated group, and transmit the updated group.

26. The computer-implemented system of claim 25, wherein the entries and requests are received from a client device, and wherein the updated group is transmitted to the client device.

27. The computer-implemented system of claim 26, wherein the client device is a mobile computing device.

28. The computer-implemented system of claim 25, wherein the leaderboard is associated with a game.

29. The computer-implemented system of claim 25, wherein the groups comprise overlap sections.

30. The computer-implemented system of claim 25, wherein the scores comprise entries, and wherein each entry comprises an identifier and a score, wherein the score is an ordinal value.

31. The computer-implemented system of claim 25, wherein the snapshot generator is further configured to generate the leaderboard by assigning ranks to the entries for the scores.

32. A system comprising: one or more computers, wherein at least one of the one or more computers comprises a snapshot generator and a server, and one or more storage devices storing instructions which are operable, when executed by the one or more computers, to cause the one or more computers to perform operations comprising:
  receiving, by the snapshot generator, entries, wherein each of the entries comprises an identifier and a score;
  sorting, by the snapshot generator, the entries by the scores according to a sorting criteria to obtain a leaderboard;
  ranking, by the snapshot generator, each of the entries with a rank according to the position of the entry on the leaderboard, wherein each of the entries further comprises the rank;
  dividing, by the snapshot generator, the entries from the leaderboard into groups, wherein each of the groups comprises consecutive entries from the leaderboard and at least two of the groups comprise a number of the same entries, wherein the same entries are in a position at the end of the first of the at least two groups and at the beginning of the second of the at least two groups, and wherein the groups are ordered sequentially;
  updating, by the snapshot generator, the first group with at least one score version comprising an entry that includes an addition indicator;
  sorting, by the snapshot generator, the entries in the first group according to the sorting criteria to obtain an updated group; and
  storing, in the one or more storage devices, the leaderboard in the form of the groups.

33. The system of claim 32, wherein the instructions are operable, when executed by the one or more computers, to cause the one or more computers to perform operations further comprising:
  receiving, by the snapshot generator, a request for the leaderboard, wherein the request comprises at least one of an identifier for a desired entry, a score for a desired entry, a rank for a desired entry, and a general request for the leaderboard associated with a default desired entry;

receiving the first group comprising the desired entry;

updating the first group with at least one score version, wherein the score version comprises an entry for an old version associated with an entry for a new version, the new version comprises one of an entry that was not in the entries sorted to obtain the leaderboard and an entry and an entry that comprises a removal indicator, and the old version comprises one of an entry that was in the entries sorted to obtain the leaderboard and the addition indicator; and transmitting the updated group.

\* \* \* \* \*